United States Patent
Jaakkola

(10) Patent No.: US 11,057,835 B2
(45) Date of Patent: *Jul. 6, 2021

(54) SYSTEM COORDINATED WLAN SCANNING

(71) Applicant: NOKIA TECHNOLOGIES OY, Espoo (FI)

(72) Inventor: Mikko Jaakkola, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,532

(22) Filed: Jun. 15, 2020

(65) Prior Publication Data
US 2020/0314757 A1  Oct. 1, 2020

Related U.S. Application Data

(63) Continuation of application No. 16/284,509, filed on Feb. 25, 2019, which is a continuation of application
(Continued)

(30) Foreign Application Priority Data

Jun. 30, 2005 (EP) .................................. 05014203

(51) Int. Cl.
*H04W 52/02* (2009.01)
*H04W 48/16* (2009.01)
(Continued)

(52) U.S. Cl.
CPC ......... *H04W 52/0258* (2013.01); *H04W 4/02* (2013.01); *H04W 48/14* (2013.01);
(Continued)

(58) Field of Classification Search
CPC ... H04W 48/16; H04W 52/0258; H04W 4/02; H04W 48/17; H04W 48/14; H04W 48/10; H04W 48/18; H04W 24/00; H04L 12/189
See application file for complete search history.

(56) References Cited

U.S. PATENT DOCUMENTS 5,504,482 A   4/1996 Schreder
5,774,829 A   6/1998 Cisneros et al.
(Continued)

FOREIGN PATENT DOCUMENTS

DE   103 33 287 A1   3/2005
EP   1 176 781 A2    1/2002
(Continued)

OTHER PUBLICATIONS

Yung-Hsiang Lu et al., "Requester-Aware Power Reduction," Stanford University USA, pp. 18-23, 1080/1820, IEEE, 2000. (No copy provided, per MPEP 609. Copy submitted in grandparent U.S. Appl. No. 15/385,022.).

(Continued)

*Primary Examiner* — Philip J Chea
*Assistant Examiner* — Mohammed Ahmed
(74) *Attorney, Agent, or Firm* — Squire Patton Boggs (US) LLP

(57) ABSTRACT

The invention proposes a scan control device, wherein in the scan operation a network detection is performed, the device comprising a request receiving means for receiving at least one request for providing scan information, and a scan control means for performing a scan operation independently from receiving the scan information requests. The invention also proposes a corresponding method and a computer program product.

29 Claims, 2 Drawing Sheets

Related U.S. Application Data

No. 15/385,022, filed on Dec. 20, 2016, now abandoned, which is a continuation of application No. 14/322,025, filed on Jul. 2, 2014, now Pat. No. 9,554,327, which is a continuation of application No. 11/377,454, filed on Mar. 17, 2006, now Pat. No. 8,856,311.

(51) Int. Cl.
*H04W 48/14* (2009.01)
*H04W 48/00* (2009.01)
*H04W 4/02* (2018.01)
*H04W 24/10* (2009.01)
*H04W 84/12* (2009.01)

(52) U.S. Cl.
CPC ........... *H04W 48/16* (2013.01); *H04W 48/17* (2013.01); *H04W 24/10* (2013.01); *H04W 84/12* (2013.01); *Y02D 30/70* (2020.08)

(56) References Cited

U.S. PATENT DOCUMENTS

| | | |
|---|---|---|
| 5,794,146 A | 8/1998 | Sevcik et al. |
| 5,799,154 A * | 8/1998 | Kuriyan ................ H04W 24/00 370/225 |
| 5,982,324 A | 11/1999 | Watters et al. |
| 6,118,498 A | 9/2000 | Reitmeier |
| 6,807,163 B1 | 10/2004 | Shi |
| 7,313,365 B2 | 12/2007 | Giacalone |
| 7,529,957 B2 | 5/2009 | Krantz et al. |
| 7,561,545 B2 | 7/2009 | Abdel-Kader |
| 7,583,643 B2 | 9/2009 | Smith et al. |
| 7,593,727 B2 | 9/2009 | Zhao |
| 7,965,675 B2 | 6/2011 | Rahim |
| 7,969,907 B2 | 6/2011 | Shah et al. |
| 7,996,505 B2 | 8/2011 | Krantz et al. |
| 2001/0006892 A1 | 7/2001 | Barnett et al. |
| 2002/0018456 A1 | 2/2002 | Kakemizu et al. |
| 2002/0019698 A1 | 2/2002 | Vilppula et al. |
| 2002/0059434 A1* | 5/2002 | Karaoguz ............. H04W 48/18 709/228 |
| 2002/0080752 A1 | 6/2002 | Johansson et al. |
| 2003/0140130 A1 | 7/2003 | Evrard et al. |
| 2003/0158922 A1 | 8/2003 | Park |
| 2004/0052231 A1* | 3/2004 | Ramaswamy ........ H04W 48/18 370/338 |
| 2004/0057384 A1 | 3/2004 | Le et al. |
| 2004/0093398 A1 | 5/2004 | Tang et al. |
| 2004/0110530 A1 | 6/2004 | Alone et al. |
| 2004/0120278 A1* | 6/2004 | Krantz ................. H04W 48/16 370/328 |
| 2004/0176024 A1* | 9/2004 | Hsu ....................... H04W 48/10 455/3.04 |
| 2004/0236851 A1 | 11/2004 | Kuan et al. |
| 2005/0025181 A1 | 2/2005 | Nazari |
| 2005/0030913 A1* | 2/2005 | Roy ........................ H04L 51/14 370/310 |
| 2005/0059397 A1 | 3/2005 | Zhao |
| 2005/0068928 A1 | 3/2005 | Smith et al. |
| 2005/0080884 A1 | 4/2005 | Siorpaes et al. |
| 2005/0096053 A1 | 5/2005 | Liu |
| 2005/0097199 A1 | 5/2005 | Woodard et al. |
| 2005/0153736 A1 | 7/2005 | Ganton |
| 2005/0163078 A1 | 7/2005 | Oba et al. |
| 2005/0170852 A1 | 8/2005 | Li et al. |
| 2005/0191987 A1 | 9/2005 | Zhao et al. |
| 2005/0245269 A1 | 11/2005 | Demirhan et al. |
| 2006/0028998 A1 | 2/2006 | Lioy et al. |
| 2006/0077926 A1 | 4/2006 | Rune |
| 2006/0135068 A1 | 6/2006 | Jaakkola et al. |
| 2006/0142004 A1 | 6/2006 | He |
| 2006/0146834 A1* | 7/2006 | Baker ............... H04W 36/0088 370/395.53 |
| 2006/0160543 A1* | 7/2006 | Mashinsky ........... H04W 16/10 455/452.2 |
| 2006/0171357 A1* | 8/2006 | King ................... H04W 72/046 370/331 |
| 2006/0185012 A1 | 8/2006 | Olivereau et al. |
| 2006/0187873 A1* | 8/2006 | Friday ................... H04W 48/20 370/328 |
| 2006/0251034 A1 | 11/2006 | Park |
| 2006/0280128 A1* | 12/2006 | Abdel-Kader ........... G01D 7/08 370/254 |
| 2007/0286143 A1 | 12/2007 | Olson et al. |
| 2008/0052754 A1 | 2/2008 | Iga |

FOREIGN PATENT DOCUMENTS

| | | |
|---|---|---|
| EP | 1 257 090 A1 | 11/2002 |
| EP | 1 392 022 A2 | 2/2004 |
| EP | 1 463 257 A1 | 9/2004 |
| EP | 1 526 682 A2 | 4/2005 |
| EP | 1 732 266 A1 | 6/2005 |
| EP | 1 517 572 A1 | 12/2006 |
| EP | 2282559 A2 | 2/2011 |
| JP | H09259054 A | 10/1997 |
| JP | 2000-10258 A | 4/2000 |
| JP | 2000-259790 A | 9/2000 |
| JP | 2001-101351 A | 4/2001 |
| JP | 2001134512 A | 5/2001 |
| JP | 2001189689 A | 7/2001 |
| JP | 2001521301 A | 11/2001 |
| JP | 2004500785 A | 1/2004 |
| JP | 2004157851 A | 6/2004 |
| JP | 2004252928 A | 9/2004 |
| JP | 2004266835 A | 9/2004 |
| JP | 2005012539 A | 1/2005 |
| JP | 2005033758 A | 2/2005 |
| JP | 2005159771 A | 6/2005 |
| JP | 2005286626 A | 10/2005 |
| JP | 2006013594 A | 1/2006 |
| WO | 01/82562 A2 | 11/2001 |
| WO | 03/065682 A1 | 8/2003 |
| WO | 2005029344 A1 | 3/2005 |
| WO | 2005029888 A1 | 3/2005 |

OTHER PUBLICATIONS

Christos Efstratiou et al., "Reflection: A Solution for Highly Adaptive Mobile Systems," Reflective Middleware Workshop, Middleware 2000, New York, Apr. 2000, pp. 1-2. (No copy provided, per MPEP 609. Copy submitted in grandparent U.S. Appl. No. 15/385,022.).

Steffen Volz et al., "Nexus: The Development of a Platform for Location Aware Applications," Institute of Photogrammetry, University of Stuttgart, Germany, Jun. 1-5, 1999, pp. 1-10. (No copy provided, per MPEP 609. Copy submitted in grandparent U.S. Appl. No. 15/385,022.).

Li, W.; Qing An Zeng; Anrawal, D.P., "A reliable active scanning scheme for the IEEE 802.11 MAC layer handoff," Radio and Wireless Conference, (2003); pp. 71-74. (No copy provided per MPEP 609. Copy submitted in U.S. Appl. No. 14/322,025.).

S.H. Park et al., Springer Link, "Selective Channel scanning for Fast Handoff in Wireless LAN Using Neighbor Graph," Personal Wireless Communication, Lecture Notes in Computer Science vol. 3260, 2004, pp. 194-203. (No copy provided per MPEP 609. Copy submitted in grandparent U.S. Appl. No. 14/322,025.).

\* cited by examiner

SYSTEM COORDINATED WLAN SCANNING

CROSS REFERENCE TO RELATED APPLICATIONS

This application is a Continuation of U.S. application Ser. No. 16/284,509 filed on Feb. 25, 2019, which in turn is a Continuation of U.S. application Ser. No. 15/385,022 filed on Dec. 20, 2016, which in turn is a Continuation of U.S. application Ser. No. 14/322,025, filed on Jul. 2, 2014, which in turn is a Continuation of U.S. application Ser. No. 11/377,454, filed Mar. 17, 2006, which claims priority from European Patent Application Number 05014203.3, filed Jun. 30, 2005, the contents of which applications are herein incorporated by reference.

BACKGROUND OF THE INVENTION

Field of the Invention

The invention relates to a method and a device for wireless communication by which a scan for access networks can be performed.

Description of the Related Art

This invention is related to a network in which a device for wireless communication may establish a connection to one or more access networks. Examples for such access networks are Wireless Local Area Networks (WLAN), wherein each network is identified by a Service Set IDentifier (SSID).

There are several reasons why a device might connect to a plurality of access networks. Namely, certain applications have needs for different kind of networks. For example, access networks may include a company network, hotspot provider (ISP (Internet Service Provider) & operator) networks and home WLAN networks. Different networks can provide different set of destination networks. Here a couple of examples:

From a company network, it is possible to reach intranet and Internet but it might not be possible to send mails via your person ISP account. From a WLAN home network, you might not be possible to use intranet services. Also, in technologies like UMA (Unlicensed Mobile Access) it might not be possible to carry data over UMA in all operators, so that also in this case it might be necessary to change an access network or to use additionally an alternative access network.

Furthermore, scanning for new access networks might be advantageous in order to get cheaper connection, better performing connection, or to find a current network for a particular service, as described above. Also technologies like location information using WLAN may use extensively scanning.

When connecting to WLAN networks, it is necessary to scan for surrounding WLAN networks to which a WLAN station (STA) may connect. The scanning procedure may be a passive scan, in which the WLAN station listens to beacons delivered from surrounding Access Points (AP), or an active scan, in which the WLAN station sends probe requests and waits for an answer.

Currently, most operating systems provide a basic WLAN API (Application Programming Interface) that allows applications do the scanning of the surrounding WLAN networks. Normally, the scanning is done so that an application triggers a scan request via the API to a corresponding subsystem, which then performs the scan operation. By having all the applications to perform separate scan logic, this can create a situation where the whole system is scanning just about all the times due to one-to-one mapping of all the scan requests.

For example, it is assumed that a WLAN station (e.g., a mobile device) has six applications that each have decided to scan the surrounding networks every two minutes. This situation can result in that the system initiates a scan every 20 seconds, which is very unnecessary in most cases. This has a very large effect on power-consumption. Namely, the situation that the device has to scan every 20 seconds will cause the average power-consumption to go up by 60 mW, which is almost ten times more than a normal basic phone idle power-consumption.

FIG. 3 illustrates about the effects of the scanning to stand-by time. In particular, FIG. 3 shows the WLAN scanning impact on power consumption, wherein a smart phone performing scanning in the passive mode is taken as an example. On the ordinate, the stand-by time is plotted in hours. On the abscissa, the number of scans per hour is plotted. Furthermore, in this example a scan for only one WLAN network, indicated by the SSID (Service Set IDentifier) is carried out.

As clearly derivable from FIG. 3, the stand-by time drastically reduces when the number of scans per hour is increased.

Hence, it is desirable to reduce the scanning operations.

Heretofore, some implementations prohibit a system to do scanning too often, and they are implementing this feature so that the system returns the old scan result if a certain threshold time has not been passed since the previous scan. For example, the Nokia Communicator 9500 does it this way. However, this makes application programming tricky as they do not know if the scan results are actually current or not. Also, this type of behaviour forces all the applications to have separate timers and they wake up separately the application engine processor thus increasing power-consumptions. Hence, this approach does not solve the problem sufficiently.

Furthermore, while a scan operation is performed, sending and receiving of data MPDUs (MAC (Medium Access Control) Protocol Data Unit) is not possible due to implementation limitation or it is very slow, so that the long time needed for the scan results affect applications, in particular applications that have real time requirements like voice. Thus, an increased number of scan operations may be annoying for the user of the WLAN station.

SUMMARY OF THE INVENTION

Hence, it is an object of the present invention to solve the problem mentioned above and to minimize the number of scans.

This object is solved by a scan control device, wherein in the scan operation a network detection is performed, the device comprising a request receiving means (request receiver) for receiving at least one request for providing scan information, and a scan operation control means (scan operation controller) for performing a scan operation independently from receiving the scan information requests.

Alternatively, the above object is solved by a method for controlling a scan operation, wherein in the scan operation a network detection is performed, the method comprising the steps of receiving at least one request for providing scan information, and controlling performing of a scan operation independently from receiving the scan information requests.

Hence, according to the invention, the scan operation is performed independently from the requests for providing scan information.

Therefore, a scan operation does not have to be performed each time such a request is received, but a scan operation can be carried out independently. In this way, only one scan operation is necessary during a particular time period, whereas according to the prior art for example scan operations in the number of the applications were necessary during the same time period.

Hence, the number of scans and, thus, the power-consumption can be considerably reduced.

Hence, according to the invention, an application transparent way of doing scanning is provided so that as many applications as possible could use the same scan results, so that not every application would be doing this scanning on their own.

Advantageous developments are set out in the dependent claims.

For example, the scan operation control means may send scan information which is obtained based on the scan operation. Moreover, the request for providing scan information may be stored in a memory, and the scan information may be sent by referring to the request stored in the memory. That is, a scan request does not have to be processed immediately but can be stored and is pending. When the result is to be sent to the application issued the request, the scan information is sent using information from this request.

Alternatively, the request may be a registration for a scan event. That is, an application can register to the scan event.

Furthermore, a maximum latency value may be received which indicates a maximum delay time by which a scan operation may be delayed. That is, an application requesting the scan operation can indicate which maximum delay time it allows for the scanning operation.

In detail, the request for providing scan information may contain a parameter indicating the maximum latency value.

Alternatively, the maximum latency value may be provided in a separate message.

Furthermore, an interval for performing the scan operation may be set based on the maximum latency value.

In case there are a plurality of requests for providing scan information and a plurality of maximum latency values, the interval may be set based on the minimum value of the maximum latency values.

The network detection may be performed with respect to at least one Wireless Local Area Network (WLAN). That is, the networks in question may be WLAN networks.

The device may be an Application Programming Interface (API).

Moreover, a plurality of application devices may be provided, and the scan control device may be configured to forward scan information to all application devices simultaneously.

The method according to the invention may be realized as a computer program product for a processing device, comprising software code portions for performing the steps of the method according to the invention when the program is run on the processing device. The computer program product may comprise a computer-readable (readable for the processing device) medium on which the software code portions are stored.

In this case, the request to provide scan information may be generated by at least one application module for executing an application.

Furthermore, in case a plurality of application modules are present, the scan control module may forward scan information to all application devices simultaneously. The scan control module may be implemented in an Application Programming Interface (API).

In particular, the processing device may be part of a WLAN apparatus (in more detail, a part of a WLAN host device), so that the computer program may be stored in a memory of the WLAN apparatus.

BRIEF DESCRIPTION OF THE DRAWINGS

The invention is described by referring to the enclosed drawings, in which.

DETAILED DESCRIPTION OF THE PREFERRED EMBODIMENTS

In the following, a preferred embodiment of the present invention is described by referring to the attached drawings.

In particular, according to the preferred embodiment, an API (as an example for a scan control device) is provided, which controls the scan operation such that the actual scan is performed independently from scan requests. That is, the actual scan is carried out at an own, independent timing.

Figure 1:
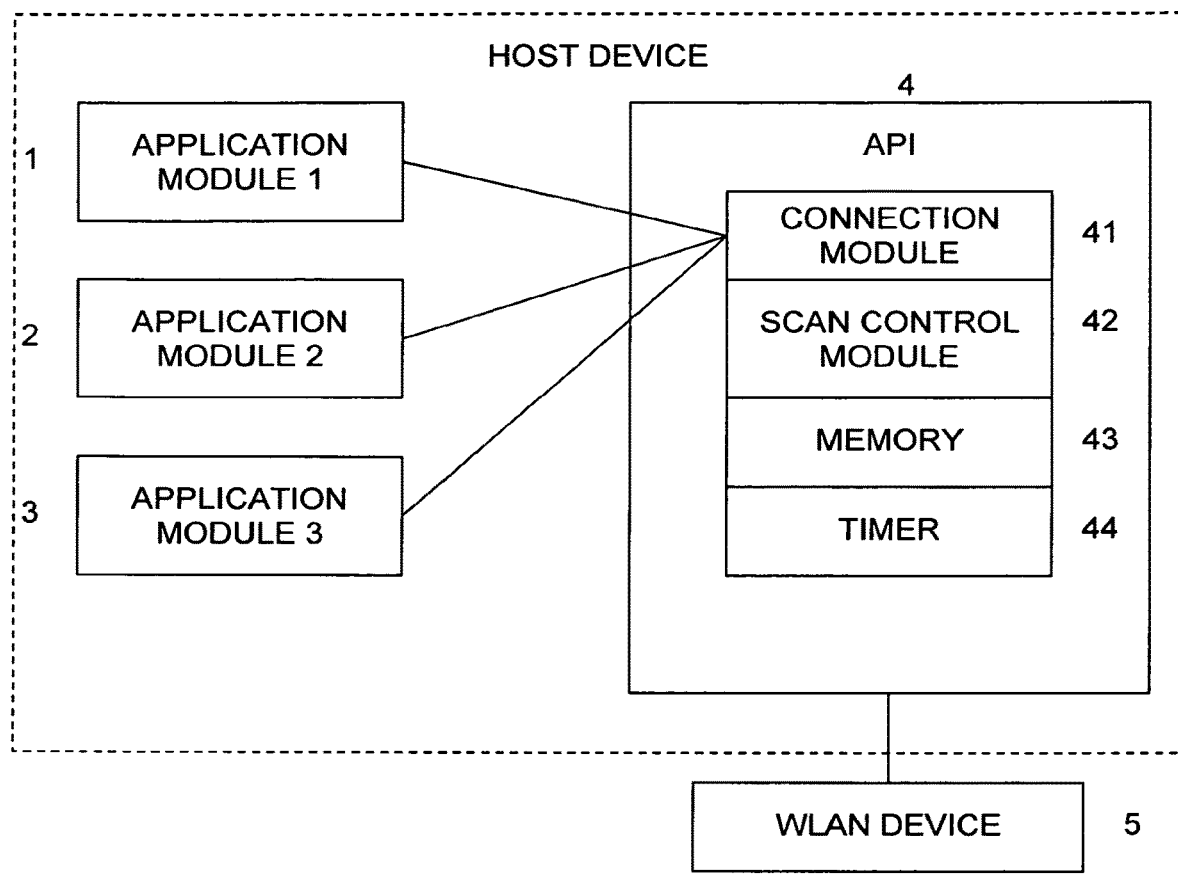
FIG. 1 shows a block diagram of a WLAN apparatus according to a preferred embodiment of the invention.
Figure 2:
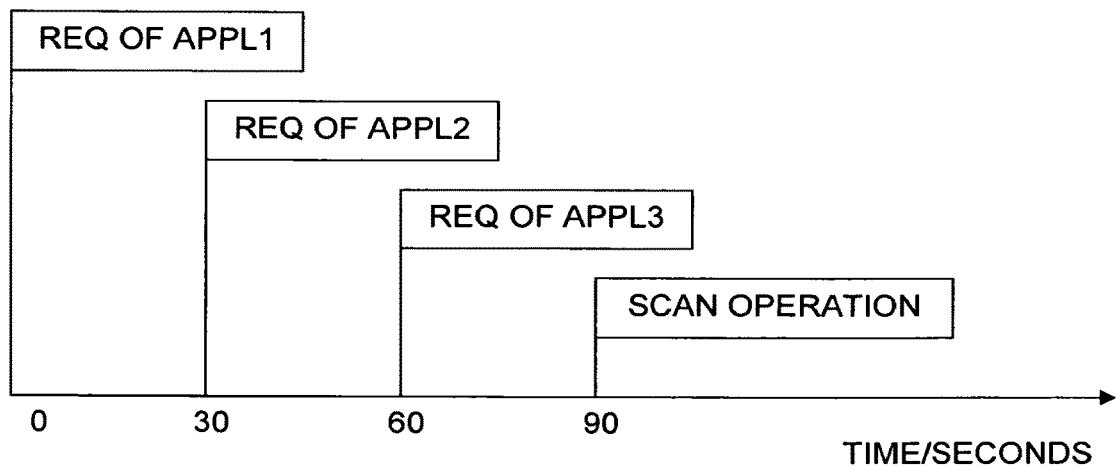
FIG. 2 shows timings of issuing scan request of several applications in order to illustrate the operation according to the preferred embodiment.
Figure 3:
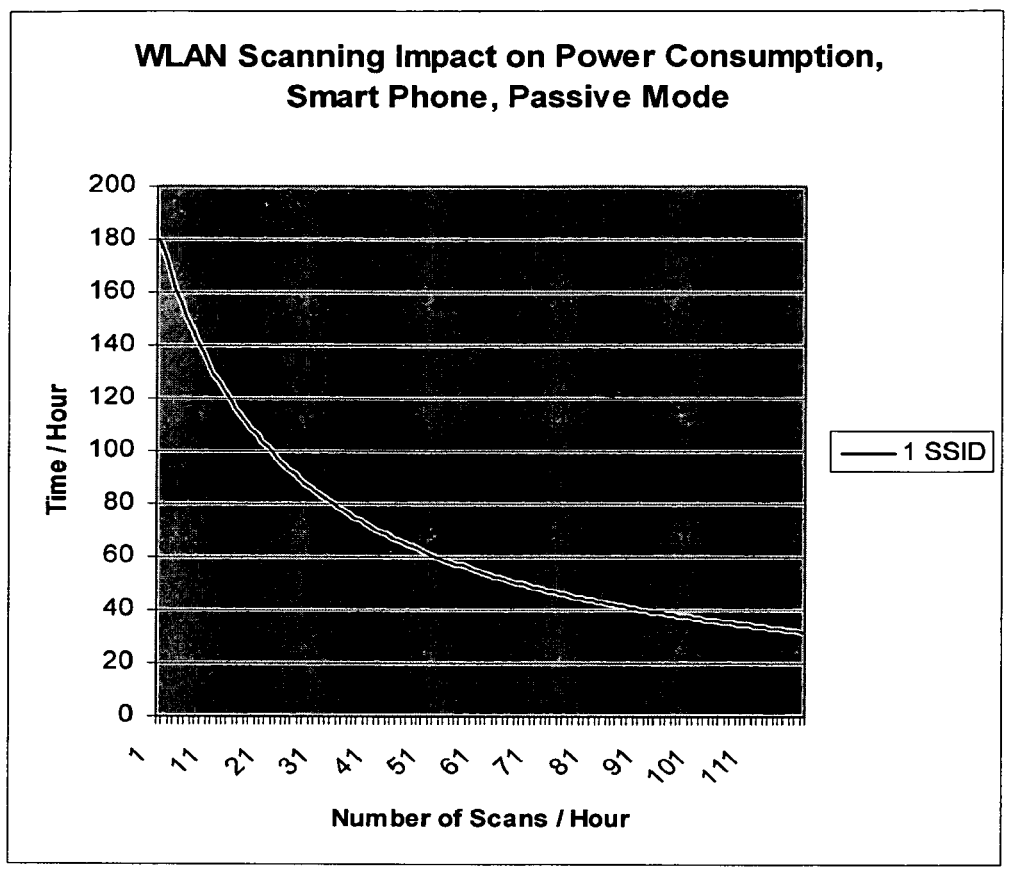
FIG. 3 illustrates WLAN scanning impact on power consumption according to the prior art.

This is described in more detail by referring to FIGS. 1 and 2.

FIG. 1 shows a block diagram of a WLAN station (as an example for an apparatus for wireless communication) according to the preferred embodiment, wherein three applications, i.e., application modules 1 to 3, an Application Programming Interface (API) 4 (as an example for a scan control device) and a WLAN device 5 are shown. The WLAN device 5 comprises a means for performing the actual scan, e.g., an antenna and a transceiver (not illustrated).

The WLAN station or WLAN apparatus comprise the WLAN device 5 and a host device, wherein in the host device the application modules 1 to 3 and the API are accommodated.

It is noted that the WLAN device can be a WLAN card to be inserted in a laptop computer, in a PDA (personal digital assistant), a mobile phone, a WLAN enabled device connected to the host by some other wireless technology e.g. bluetooth, a USB (Universal Serial Bus) stick inserted in a USB port of a laptop computer or a fixed personal computer or the like. In these cases, the laptop computer and the fixed personal computers are examples for host devices. Furthermore, the WLAN apparatus can be a laptop computer having an on-board WLAN functionality, a WLAN enabled phone or the like. In these cases, the WLAN device and the host device are arranged within one entity, and may only be logically separated.

In FIG. 1, three main parts of the API 4 are illustrated: a connection module 41 (as an example for a request receiving means) establishes a connection to the application modules 1 to 3 in order to receive scan requests and to send scan results, a scan control module 42 for performing the actual control of the scan operation, a memory 43 for storing scan requests or scan registrations, and also for storing programs, data etc, and a timer 44 for setting scan intervals.

According to the preferred embodiment, the connection module 41 receives a scan request from at least one of the application modules. This request is forwarded to the scan control module 42 which controls the scan operation independently from the reception of the scan request.

That is, according to the present embodiment, the SW (Software) subsystem of the WLAN station provides an API that allows various applications to register for a delayed scan event when ever the system scans. When system would do the scanning, all the applications would be let to know about the scan results as a scan event, instead of having then to poll the system themselves.

Hence, according to the present embodiment a centralized way of controlling when the actual WLAN scan happens is provided by separating the interface and implementation from the applications.

It is noted that the scan request can be a direct scan request, which is basically the same as the scan known in the prior art, or alternatively a registration for a scan event. The registration for a scan event means that the application informs the API that it would like to have scan results when the WLAN device actually performs a scan operation.

In the following, the operation according to the preferred embodiment is described by referring to FIG. 2. In FIG. 2, the timings of scan requests of the applications and the actual start of the scan operation are illustrated.

In this example, it is assumed that the application 1, which wants to initiate a WLAN connection when it sees a network 'a', decides to register itself for scan events. Application 1 decides then to also set that it would like the system to scan after every 2 minutes. This registration or request is issued at the beginning of the illustrated sequence, i.e., at 0 seconds.

Then, the application 2 is started 30 seconds later and it also wants to initiate a WLAN connection when it sees a network 'b'. Thus, it decides to register itself for scan events. It also sets its scan period to be 2 minutes.

Then, application 3 is started further 30 seconds later and it also wants to initiate a WLAN connection when it sees a network 'b' decides to register itself for scan events. It sets its scan period to be 3 minutes. This registration or request is issued at 60 seconds.

After 30 seconds the system (i.e., the WLAN device under control of the API 4, and in more detail, of the scan control module 42) scans and the scan results are delivered to all the applications simultaneously. As the maximum interval for the scan is two minutes (the interval of 3 minutes requested by the application 3 would be to long for the applications 1 and 2), the system waits for another two minutes after providing another scan results. That is, the scan control module 42 sets the timer 44 to two minutes, so that a scan operation is performed every 2 minutes.

In contrast thereto, according to the prior art, the scan operation would have been carried out immediately upon issuing the corresponding scan requests and then at each individual interval. That is, in average every 40 seconds the scan operation would have been carried out.

It is noted that the actual scan operation can be started at an arbitrary timing independent from the timings of issuing the scan requests. For example, a first scan operation can already be carried out immediately (e.g., 5 seconds) after receiving the first scan request from application 1. The applications 2 and 3, which issued their scan requests or registered to the scan event later, will be provided with the scan results upon the next scan operation, i.e., at 2 minutes and 5 seconds after the start.

Thus, according to the preferred embodiment the amount of power needed by the WLAN chipset (WLAN device) as well as the host processors (including API and applications) is reduced.

Hence, in order to implement this type of service, the API is adapted to allow applications to register for scan events or issue a scan request that will be pending on the WLAN subsystem until the subsystem actually performs scan, and then the call is returned, i.e., the scan results are delivered to the applications. Furthermore, the API allows some way of setting the maximum scan latency by the applications. This can be done either during the pending scan requests as a parameter or by setting a separate application specific MIB (Management Information Base).

The parameter during the scan request is referred to as a maximum pending timeout parameter with a pending scan request (asynchronous scan request). Many operating systems provide an asynchronous service that allows client send a message to service and still carry on executing its code path until it receives an indication about the completion of the request.

In the following, an implementation example for such a type of request from client side for this type is described, wherein a start with forced scan and then a move into a periodic mode is illustrated. It is noted that the following examples are written in a pseudo code based on the computer language C.

AsyncHandle handle;

```
MaximumScanLatency latency = 0;
ScanNetwork (latency, &handle, &ScanBuffer);
... execute other operations
ScanCompleteIndication(void* ScanBuffer){
  // Apparently the scan has completed
  ProcessScanRequest(ScanBuffer);
  // Let's resubmit the scan request to make scanning periodic
  latency = TrueMaximumValue;
  ScanNetwork(latency, &handle,&ScanBuffer);
}
```

From service side this might look like:

```
ScanNetworkRequest(MaximumScanLatency, AsyncHandle* hHandle, void* ScanBuffer){
  CurrentBuffer = ScanBuffer;
  RequestHandle = hHandle;
  ....
  ....
}
TimerComplete(){
  PerformScan(...);
}
```

```
ScanComplete(ScanResults* pResult ){
    CopyResults(CurrentBuffer, ScanResult);
    CompleteAsyncRequest(hHandle); // Completes the OS request and
indicated that to client
    ResetTime(Minimum(MaxScanLatencyList));
}
```

Hence, according to the present embodiment, it is possible to provide parameters with an asynchronous request, which is also referred to as a pending request.

It is noted that it is basically possible to force the subsystem to do the scanning right away by specifying the MaximumScanLatency to zero. However, this is only sensible for initial scan requests (or an "emergency scan request" after losing connection or the like), since this would imply that also during normal operation (i.e., after the starting procedure), scanning has to be performed all the time.

In the above example, this maximum scan latency is 2 minutes for applications 1 and 2, and 3 minutes for application 3. That is, the scan interval is set according to the minimum of maximum scan latencies of the applications, which is 2 minutes in the above example.

The system may perform a basic scanning right away when the first request is being issued, but after that all the framework initiated scans are synchronized together so that the maximum latency would always be respected.

Furthermore, if some other system events trigger scan (immediate scan request call etc.), then the framework will make use of the new scan requests by providing the scan information for application as well and basically resetting the timer again.

That is, in case an immediate scan operation is required, the scan control module 42 immediately performs the scan operation and resets the timer 44, so that the next scan operation is performed after the interval previously set with the timer 44.

Moreover, in case a new request is issued or another application registers to the scan event, the interval can be adapted. That is, in case an application 4 in the above example needs to have a scan operation every 1 minute, than the interval is to 1 minute, so that also the value of the timer 44 would be rewritten to 1 minute. A similar operation is carried out when an earlier request or registration is modified, namely when, for example, it is for some reason necessary for application 1 to have a scan operation every 1 minute.

To applications, the type of scanning according to the present embodiment would look like a delayed scan request but most of the applications would not care about this as usually scanning is anyway a periodic operation.

That is, in a practical implementation, it is not necessarily required to adapt the applications to the scan procedure according to the present embodiment. They can simply issue scan requests as in the prior art, but will receive the results delayed.

That is, the scan requests may be simply stored in the memory 43, and when the scan result is sent to the application modules 1 to 3, the scan control module 42 refers to the stored scan request in order to address the corresponding application module, for example.

However, as already mentioned above, alternatively the application can register to the scan event.

Hence, according to the present embodiment, the power-consumption due to scanning operations can be significantly reduced. That is, the stand-by time of a WLAN station (such as a mobile phone, a laptop computer or the like with WLAN functionality) can be considerably prolonged.

Moreover, also the traffic due to scanning is reduced so that radio resources may be saved.

The more applications there are, the more benefits from power-consumption point of view can be achieved. Having system initiated scanning can also help applications to react for certain events. For example, when connection gets bad, the system will start performing an automatic scan operation immediately in order to roam. Then, all the scan results are being delivered to the applications, which gives them more time to adapt to the low signal conditions.

Namely, if, by using the conventional technique, all applications would start doing separate scanning, and one scan would take 0.5 seconds, then, in a case of five applications, the last application would get its result after 2.5 seconds. In contrast thereto, all applications receive the scan results after the first scan, i.e., after 0.5 seconds.

Hence, according to the present embodiment, an application transparent way of doing scanning is provided so that as many applications as possible could use the same scan results, so that no every application would be doing this scanning on their own.

Further possibility to benefit from this invention in WLAN station power consumption sense is that the WLAN station can be set to operate in a low power mode. In such case there would be a limit for the scanning frequency. Such a limit could be e.g. one scan per 30 s. Since scanning would not be made more often, the applications registered for scan events might have to settle for the same scan result several times. Nevertheless, there would be the advantage of performing scans for all the registered applications instead performing scans for all the applications separately and simultaneously save power.

The invention is not limited to the embodiment described above, and various modifications are possible.

For example, the invention is not limited to WLAN, but can also be applied to other radio networks in which it is necessary to perform a scan operation in order to detect access networks.

The invention can also be realized by a computer program product. The computer program product, i.e., the computer code may be stored on a medium, e.g., a memory card, a RAM (Random access memory) or a ROM (read only memory), a hard drive, a CD-ROM or a DVD-ROM.

In this case, the different applications described above are application program modules, and the API is realized as an API program module.

What is claimed is:
1. An apparatus, comprising:
at least one processor;
an antenna;
a wireless transceiver; and a memory storing instructions that, when executed by the at least one processor, cause the apparatus at least to:

receive at least one request to provide information based on a wireless scan, and process at least a first scan interval and at least a second scan interval wherein the at least a first scan interval is associated with at least a first application on the apparatus and wherein the at least a second scan interval is associated with at least a second application on the apparatus, wherein a time for performing at least one scan operation is based at least on the at least a first scan interval and the at least a second scan interval;

perform the at least one scan operation based on the time for performing at least one scan operation, wherein the at least one scan operation comprises a wireless network detection; and control, in a centralized manner, the performing of the at least one scan operation independently from the receiving at least one request to provide information based on a wireless scan.

2. The apparatus of claim 1, wherein the memory stores instructions that, when executed by the at least one processor, further cause the apparatus at least to:

provide an application programming interface that at least partially enables the apparatus to centrally process the at least first scan interval and the at least second scan interval.

3. The apparatus of claim 1, wherein the memory stores instructions that, when executed by the at least one processor, further cause the apparatus at least to:

provide an application programming interface that at least partially enables the apparatus to centrally control the at least one scan operation such that an actual scan is performed independently from receiving scan requests.

4. The apparatus of claim 1, wherein the time for performing at least one scan operation is based at least on a smallest value of the at least a first scan interval and the at least a second scan interval.

5. The apparatus of claim 1, wherein the memory stores instructions that, when executed by the at least one processor, further cause the apparatus at least to:

based on receiving at least two requests for wireless scans, centrally process the at least a first scan interval and the at least a second scan interval; and centrally control the performing of the at least one scan operation independently of the receiving of the at least two requests for wireless scans.

6. The apparatus of claim 1, wherein the memory stores instructions that, when executed by the at least one processor, further cause the apparatus at least to:

based on centrally receiving at least two requests for wireless scans, centrally process the at least a first scan interval and the at least a second scan interval; and centrally control the performing of the at least one scan operation independently of but based on the centrally receiving of the at least two requests for wireless scans.

7. The apparatus of claim 1, wherein the memory stores instructions that, when executed by the at least one processor, further cause the apparatus at least to:

control, in a centralized manner, the performing of the at least one scan operation based at least on both a request associated with the first application and a request associated with the second application.

8. The apparatus of claim 1, wherein the memory stores instructions that, when executed by the at least one processor, further cause the apparatus at least to:

use wireless local area network (WLAN) functionality for the at least one scan operation.

9. The apparatus of claim 1, wherein the memory stores instructions that, when executed by the at least one processor, further cause the apparatus at least to:

centrally process at least two requests for registration for scan events; and wherein one of the requests for registration for scan events is associated with at least the first application and wherein another of the requests for registration is associated with at least the second application.

10. The apparatus of claim 1, wherein the memory stores instructions that, when executed by the at least one processor, further cause the apparatus at least to:

centrally process at least two latency values as part of the centrally processing of the at least a first scan interval and of the at least a second scan interval;

wherein one of the at least two latency values is associated with the first application and another of the at least two latency values is associated with the second application;

wherein one of the at least two latency values indicates a delay time by which a scan operation may be delayed for the first application; and wherein another of the at least two latency values indicates a delay time by which a scan operation may be delayed for the second application.

11. The apparatus of claim 1, wherein the memory stores instructions that, when executed by the at least one processor, further cause the apparatus at least to:

use wireless local area network (WLAN) for location information.

12. The apparatus of claim 1, wherein the memory stores instructions that, when executed by the at least one processor, further cause the apparatus at least to:

centrally process a first request for a wireless scan associated with the first application;

centrally process a second request for a wireless scan associated with the second application;

centrally control performing a wireless local area network (WLAN) scan as part of the control, in a centralized manner, of the performing of the at least one scan operation; and wherein the centrally controlling the performing a wireless local area network (WLAN) scan is done independently of but based on the centrally processing of the first request for a wireless scan and independently of but based on the centrally processing of the second request for a wireless scan.

13. The apparatus of claim 12, wherein the first request for a wireless scan and the second request for a wireless scan will be pending on a wireless local area network (WLAN) subsystem of the apparatus until the wireless local area network (WLAN) subsystem actually performs the wireless local area network (WLAN) scan.

14. The apparatus of claim 1, wherein the memory stores instructions that, when executed by the at least one processor, further cause the apparatus at least to:

centrally control performing at least one wireless local area network (WLAN) scan not based on the time for performing at least one scan operation;

centrally control performing at least one subsequent wireless local area network (WLAN) scan based on the time for performing at least one scan operation; and wherein centrally controlling the performing of the at least one subsequent wireless local area network (WLAN) scan is based on requests associated with at least the first application and the second application but independent of timing of reception of requests associated with the first application and the second application.

15. The apparatus of claim 1, wherein the memory stores instructions that, when executed by the at least one processor, further cause the apparatus at least to:
allow at least the first application and the second application to centrally register for scan events; and
centrally control performing scans for at least the first application and the second application such that performing at least some scans for the first application and the second application separately would not be required.

16. The apparatus of claim 1, wherein the memory stores instructions that, when executed by the at least one processor, further cause the apparatus at least to:
provide at least the first application and the second application information that is obtained based on the at least one scan operation.

17. The apparatus of claim 1, wherein the memory stores instructions that, when executed by the at least one processor, further cause the apparatus at least to:
provide information that is obtained based on the at least one scan operation at least to the first application and the second application; and
wherein at least part of the information provided to at least the first application and the second application based on the at least one scan operation is the same.

18. The apparatus of claim 1 wherein the memory stores instructions that, when executed by the at least one processor, further cause the apparatus at least to:
if an initial scan operation is either requested or required, centrally control performing the initial scan operation based on the request or requirement for the initial scan operation and not according to the time for performing the at least one scan operation; and
centrally adjust the time for performing the at least one scan operation based at least on both timing of this initial scan operation and on a smallest value of the at least a first scan interval and the at least a second scan interval.

19. The apparatus of claim 1 wherein the memory stores instructions that, when executed by the at least one processor, further cause the apparatus at least to:
centrally control performing scans for at least the first application and the second application such that performing at least some scans for the first application and the second application separately would not be required.

20. The apparatus of claim 1, wherein the at least one scan operation comprises a passive wireless scan.

21. The apparatus of claim 1, wherein the at least one scan operation comprises an active wireless local area network (WLAN) scan.

22. The apparatus of claim 1, wherein the memory stores instructions that, when executed by the at least one processor, further cause the apparatus at least to:
centrally receive the at least one request to provide information based on a wireless scan; and
control, in a centralized manner, the performing of the at least one scan operation independently from the centrally receiving the at least one request to provide information based on a wireless scan.

23. The apparatus of claim 1, wherein the information based on a wireless scan comprises location information.

24. The apparatus of claim 1, wherein the information based on a wireless scan comprises wireless local area network (WLAN) scan information.

25. The apparatus of claim 1, wherein the at least one scan operation comprises a wireless local area network (WLAN) scan operation;
wherein the wireless local area network (WLAN) scan operation comprises a delayed wireless local area network (WLAN) scan event; and wherein the memory stores instructions that, when executed by the at least one processor, further cause the apparatus at least to:
enable an application program interface configured to allow a registration associated with at least the first application for the delayed wireless local area network (WLAN) scan event and that allows a registration associated with at least the second application for the delayed wireless local area network (WLAN) scan event; and
wherein once the apparatus performs a wireless local area network (WLAN) scan associated with the delayed wireless local area network (WLAN) scan event, provide information based on the wireless local area network (WLAN) scan to both at least the first application and at least the second application; and
wherein because of the providing of the information based on the wireless local area network (WLAN) scan to both at least the first application and at least the second application, at least the first application and at least the second application would not need to poll a system on the apparatus to obtain the information based on the wireless local area network (WLAN) scan.

26. The apparatus of claim 1, wherein the at least one scan operation comprises a wireless local area network (WLAN) scan operation; and
wherein the memory stores instructions that, when executed by the at least one processor, further cause the apparatus at least to:
provide a centralized and at least a partially independent way of controlling when the wireless local area network (WLAN) scan operation occurs by at least the following: separating at least in software on the apparatus (1) an interface associated at least in part with wireless local area network (WLAN) functionality on the apparatus and (2) controlling actual implementation of the wireless local area network (WLAN) scan operation on the apparatus from (3) at least the first application and at least the second application.

27. A method, comprising:
receiving, in a wireless apparatus, at least one request to provide information based on a wireless scan;
processing at least a first scan interval and at least a second scan interval wherein the at least a first scan interval is associated with at least a first application on the wireless apparatus and wherein the at least a second scan interval is associated with at least a second application on the wireless apparatus,
wherein a time for performing at least one scan operation is based at least on the at least a first scan interval and the at least a second scan interval;
performing the at least one scan operation based on the time for performing at least one scan operation,
wherein the at least one scan operation comprises a wireless network detection; and
controlling, in a centralized manner, the performing of the at least one scan operation independently from the receiving at least one request to provide information based on a wireless scan.

28. The method of claim 27, further comprising:
based on receiving at least two requests for wireless scans, centrally processing the at least a first scan interval and the at least a second scan interval; and
centrally controlling the performing of the at least one scan operation independently of but based on the receiving of the at least two requests for wireless scans.

29. A non-transitory computer readable medium comprising program instructions for causing a wireless apparatus to perform at least the following:
receiving, in the wireless apparatus, at least one request to provide information based on a wireless scan;
processing, in the wireless apparatus, at least a first scan interval and at least a second scan interval wherein the at least a first scan interval is associated with at least a first application on the wireless apparatus and wherein the at least a second scan interval is associated with at least a second application on the wireless apparatus,
wherein a time for performing at least one scan operation is based at least on the at least a first scan interval and the at least a second scan interval;
performing the at least one scan operation based on the time for performing at least one scan operation,
wherein the at least one scan operation comprises a wireless network detection; and
controlling, in a centralized manner, the performing of the at least one scan operation independently from but based on the receiving at least one request to provide information based on a wireless scan.

* * * * *